L. F. HELLMANN AND W. W. BAXTER.

AUTOMATIC RAILWAY SAFETY CONTROL.

APPLICATION FILED MAR. 14, 1921.

Reissued Apr. 25, 1922. 15,343.

Inventors

Lui F. Hellmann

William W. Baxter

By E. W. Bradford

Attorney

UNITED STATES PATENT OFFICE.

LUI F. HELLMANN AND WILLIAM W. BAXTER, OF INDIANAPOLIS, INDIANA, ASSIGNORS TO AIR BRAKE SAFETY APPLIANCE CO., OF INDIANAPOLIS, INDIANA, A CORPORATION.

AUTOMATIC RAILWAY SAFETY CONTROL.

15,343. Specification of Reissued Letters Patent. Reissued Apr. 25, 1922.

Original No. 1,340,861, dated May 18, 1920, Serial No. 297,107, filed May 14, 1919. Application for reissue filed March 14, 1921. Serial No. 452,299.

*To all whom it may concern:*

Be it known that we, LUI F. HELLMANN and WILLIAM W. BAXTER, citizens of the United States, residing at 1549 Leonard Street and 128 South Traub Street, respectively, in the city of Indianapolis, county of Marion, and State of Indiana, have invented certain new and useful improvements in automatic railway safety controls to be used on and in connection with trains operated by electricity, steam, or other means of motive force, of which the following is a specification.

Our invention relates more especially to those modes of conveyance and transportation which operate by means of some power over a line of rails, and which are equipped, or are to be equipped, with air brakes, or other pressure types of brakes, of that type most commonly known as the air brake system.

The object of our invention is to produce a means for eliminating the human factor from the control of the train during such times when the train shall have become dangerous, and a menace to public safety, by virtue of some failure of the air supply system which will cause the pressure in said air supply system to become dangerously low, or fail entirely.

A further object of our invention is to produce a means for automatically taking over the control of the train when, through carelessness or neglect of the driver, the train shall have become a menace to public safety.

A further object of our invention is to produce a means which will prevent the operation of the train until the brake system shall be in an operative and safe condition.

A further object of our invention is to produce a positive means for accomplishing the objects above set forth.

A further object of our invention is to produce a means, which, if tampered with, will prevent the operation of the train.

A further object of our invention is to produce a means, wherein the failure of any vital part thereof will cause the train to stop, and will prevent further operation of the train until the defect has been remedied, or proper safety precautions taken.

With these objects in view our invention consists generally, of an automatic brake control valve placed in connection with the hand control valve; an electro-magnetic means for operating said valve; an electro-pneumatic switch for controlling the operation of said valve, for controlling the predetermined limits of the permissible variation of the brake pressure, and for operating the motive power cut-out magnet; and an electro-magnetically operated circuit breaker or throttle valve or other means for controlling motive force to the train.

Our invention further consists of various details of construction and arrangement of parts, all as will be fully described hereinafter and particularly pointed out in our claims.

Our invention will be more readily understood by reference to the accompanying drawings which form a part of this specification, and in which,—

Figure 1:
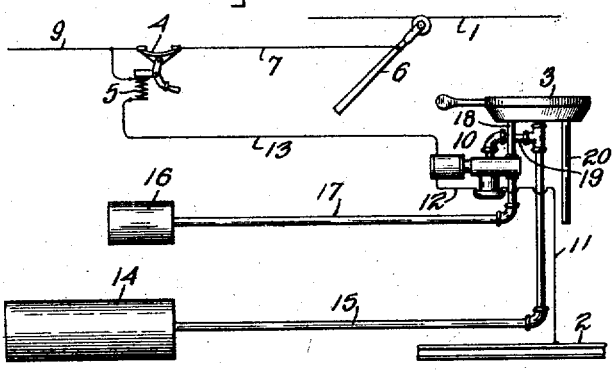
Figure 1 represents a general diagrammatical view of the arrangement, giving the layout of the piping and the wiring diagram, and shows the application and connection of the automatic control valve with the car or train piping.
Figure 2:
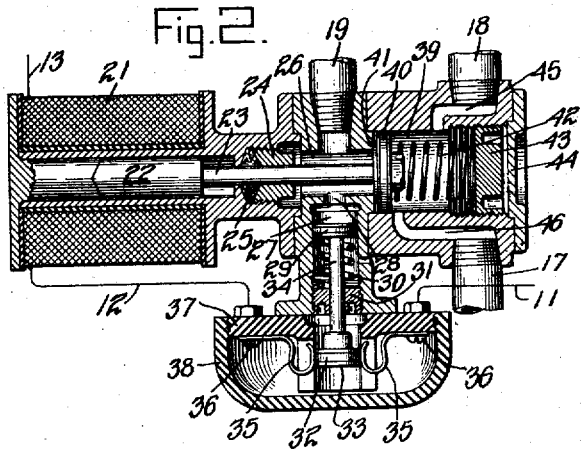
Figure 2 represents a sectional and detailed view of the automatic control valve.

Again referring to the drawings, 1 indicates the trolley wire or other source of electric power or current, 2 indicates the rails or opposite source of power. 3 indicates the driver's brake, or hand control, valve 4 indicates an auxiliary circuit breaker. 5 indicates the magnet which trips the circuit breaker 4, when the current fails. Magnet 5 can be placed in conjunction with the regular circuit breaker and still accomplish the desired results.

6 indicates the trolley or other means for taking up the electric current, 7 indicates the wire carrying said current to the circuit breaker 4; 9 indicates the wire carrying said current from the circuit breaker 4 to the motors and other devices which may be upon the car or train.

10 indicates the automatic control valve, 11 indicates the wire carrying the current from the track or other means or source of power, into the contact devices of the control valve.

12 indicates the wire carrying the current from the contact devices of the control valve into the magnet of the same, while 13 indicates the wire from the magnet of the control valve to the trip magnet of the circuit breaker.

14 indicates the tank or storage reservoir, for brake pressure and 15 indicates the pipe line carrying this pressure from the tank 14 to the hand control valve 3.

16 indicates the brake cylinder and 17 indicates the pipe carrying the pressure between the control valve 10 and the brake cylinder 16, while 18 indicates the pipe between the hand control valve 3 and the automatic control valve 10.

19 indicates the pipe carrying the pressure between the main reservoir line 15 and the automatic control valve 10, and 20 the release or atmospheric pressure line.

21 indicates the magnet of the automatic control valve 10, 22 indicates the solenoid plunger for the same, 23 indicates the piston rod, 24 the piston rod packing nut and 25 the piston rod packing.

26 indicates the main pressure space, 27 indicates the contact pressure cylinder, 28 indicates the port between the pressure space 26 and the contact cylinder 27, 29 indicates the contact piston, 30 the contact piston release spring, 31 the release spring adjusting nut, 32 the contact surface, 33 the contact surface insulation and 34 the contact piston rod.

35 indicates the contact springs, 36 the contact holding screws, 37 the contact insulation and 38 the cover.

39 indicates the main cylinder, 40 the main piston, 41 the main piston packing, 42 the main spring, 43 the main spring adjusting nut, 44 the cylinder head, 45 indicates the port to pipe 18, and 46 indicates the port to pipe 17.

The drawings which form a part of this specification are diagrammatical only and are not scaled working drawings. The sizes and pressures of the various springs shown and the proportions between the various piston areas shall be so designed and proportioned that all will properly function to give the working and results as described throughout this specification.

The operation of the automatic railway safety control is as follows,—

It is assumed that the train is in an operative or safe condition. When this condition exists there is a certain predetermined pressure in the main reservoir 14. This pressure is then flowing through the pipes 15 and 19 into the chamber 26 of the automatic control valve 10.

There is also a regular electrical pressure in the trolley wire 1 and the track 2.

The pressure in the chamber 26 is communicated to the cylinder 27 through the port 28. When this pressure is at its proper predetermined limit, it forces the piston 29, the piston rod 34, the contact surface 32 and the contact surface insulation 33 outward so that the contact surface 32 permits a free flow of electrical current between the contacts 35, thereby permitting a free flow of current from the track 2, through contacts 35, through contact surface 32, through wire 12, through magnet 21, through wire 13, through circuit breaker magnet 5, into wire 9, through the circuit breaker 4, after said circuit breaker has been thrown in, through the wire 7, through the trolley pole 6, and into the trolley wire 1. It will be noted that the track 2 is assumed as being the positive side of a direct current system. In case the trolley wire 1 is the positive side of the said system the current would flow from the trolley wire 1 to the track 2 through the same wires, breakers, magnets and contacts, except that it would flow in a reverse direction. In alternating current systems no direction of flow could be established.

Circuit breaker 4 is now thrown in by hand and a flow of current passes from the track 2 to the trolley wire 1, through the magnets 21 and 5. This flow causes magnet 5 to hold circuit breaker 4 in a closed position, and permits the normal operation of the train and the regular pump which keeps up the pressure in the tank 14.

Simultaneously the plunger 22 of the magnet 21 is drawn in and the piston 40 and the piston packing 41 are drawn in by the piston rod 23, thereby closing the chamber 26 from the cylinder 42, and thereby causing port 45 and port 46 to open into the cylinder 42 as shown, in direct communication with each other, and this said opening permits a free flow of pressure between pipes 17 and 18, and thereby permits regular or manual operation of the braking system by means of the engineer's valve 3, or regular, safe operation of the train.

When through accident, carelessness or neglect, the pressure in the tank 14 is reduced to a predetermined limit, this limit to be sufficiently high to make it effective in the operation of the brakes the pressure in the chamber 26, and consequently in the cylinder 27 is correspondingly decreased and the pressure of the spring 30 against the piston 29 causes this piston to move inward, thereby causing the contact surface 32 to withdraw from and break connections with the contacts 35, which breaks the flow of current between the wires 11 and 12.

This demagnetizes the magnet 21, releases the plunger 22 and permits the remaining pressure in the chamber 26 to force the piston 40 outward until it has passed over the port 46 and has established a free communication between the chamber 26 and the port 46. A free flow of the remaining pressure is now established from reservoir 14 through pipe 15 and 19 into the brake cylinder 16 through the pipe 17. This remaining pressure is sufficient to fully set the brakes and stop the train.

Simultaneous to the operation of the automatic brake control valve, the magnet 5 becomes demagnetized and permits the circuit breaker 4 to break the current passing between the wires 7 and 9. This operation closes off the motive power of the train and prevents the further operation thereof.

Before the train can again be operated it is necessary for the driver to hold the circuit breaker 4 in by hand, until a sufficient pressure has been reestablished to close the circuit between the wires 11 and 12, at which time the starting position will again be reestablished.

From the foregoing it will be seen that to make our invention adaptable for steam or other railways, it will merely be necessary to replace the circuit breaker 4 with a motive power throttle control valve, which would be automatically operated by the magnet 5, in which event the current for the operation of our devices would come from some internal source. We do not limit ourselves in this respect or otherwise to the specific device shown in the drawings and described in the specification, the true scope of the invention being shown in the appended claims.

Having thus fully described our said invention, what we claim as new and desire to secure by Letters Patent is:

1. An automatic safety control comprised of a means for automatically applying brakes, said means comprised of a means for maintaining a normal passage from the operator's brake control valve to the brake mechanism in combination with a means for automatically closing the passage from the operator's brake control valve to the brake mechanism, a means for opening a passage from the air supply line to the brake mechanism, said means arranged to automatically operate when the pressure in the air supply system shall have fallen to a predetermined pressure, and a means for shutting off the motive power, said means arranged to operate automatically when the pressure in the air supply system shall have fallen to a predetermined pressure, substantially as described.

2. In a combination comprising an automatic control system, a means for maintaining a normal free passage through the air line from the operator's brake control valve to the brake mechanism in combination with a means for automatically closing the passage to the operator's brake control valve and opening a passage from the air supply line to the brake mechanism, arranged to function whenever the air pressure in the air supply system shall have fallen to a predetermined pressure, and a means for shutting off the motive power, said means being operated by the means which causes the brakes to function whenever the pressure in the air supply system shall have fallen to a predetermined pressure, substantially as described.

3. An automatic control, comprised of a means for applying brakes, said means to consist of a means for maintaining a normal passage from the operator's brake control valve to the brake cylinder, a means for actuating the brake applying mechanism when the brake pressure shall have fallen to a predetermined pressure, a means for opening a secondary passage from the source of air supply to the brake cylinder, and a means for shutting off the motive power, said means consisting of a means for opening the circuit controlled by the means for actuating the brake applying mechanism when the brake pressure shall have fallen to a predetermined pressure, substantially as described.

4. An automatic control valve comprised of a means for maintaining a normal passage from the operator's brake control valve to the brake cylinder in combination with a means for closing said normal passage and opening up a secondary passage from the source of air supply to the brake cylinder, and an electro-magnet for operating said means for closing the normal passage and opening up the secondary passage, said electro-magnet to be actuated by the fall of pressure in the air supply system to a predetermined pressure, substantially as described.

5. An automatic control valve comprised of a means for maintaining a normal passage from the operator's brake control valve to the brake cylinder in combination with a means for closing said normal passage and opening up a secondary passage from the source of air supply to the brake cylinder, an electro-magnet for operating said means for closing the normal passage and opening up the secondary passage, and a means for energizing and deenergizing said electro-magnet, said means for energizing and deenergizing said electro-magnet to be actuated by the fall of pressure in the air supply system to a predetermined pressure, substantially as described.

6. In combination, normally-inoperative means for supplying motive power to a train unit, electro-magnetic means to maintain the same in operative relation, fluid operated means for applying a brake, and electro-magnetic means for controlling the brake applying means, the windings of both electro-magnetic means being in the same circuit, substantially as set forth.

7. In combination, a pair of electro-magnets, a fluid operated braking device controlled by one of said electro-magnets, and a normally inoperative conduit for motive power maintained in operative condition by the other electro-magnet, both of said electro-magnets being in the same circuit, substantially as set forth.

8. In combination, a fluid operated braking device, electro-magnetic means controlling the operation of said braking device, a second magnetic means in circuit with the first and controlling the path for motive power, said path for motive power being normally disabled, manual means to restore said path, and automatic means for disabling and restoring the first named electro-magnetic means, substantially as set forth.

9. In combination, a fluid pressure brake, a fluid pressure chamber, a passage between the brake and the chamber, a valve in the passage, an electro-magnet adapted to hold the valve in closed position, a lateral chamber opening from the pressure chamber and a piston in said chamber adapted on undue fall of pressure to de-energize the electro-magnet, substantially as set forth.

10. In combination, a fluid-operated brake, a valve to control the flow of fluid to the brake, a spring and a magnet co-operating to hold the valve in one position and means to de-energize the magnet whereupon the fluid pressure may overcome the effect of the spring, substantially as set forth.

11. In combination, a fluid pressure brake, a fluid pressure chamber, a passage between the brake and the chamber, a valve in the passage, an electro-magnet adapted to hold the valve in closed position, a piston operated by the pressure in the chamber, and a switch in circuit with the electro-magnet and controlled by said piston, substantially as set forth.

12. A fluid-operated brake-applying mechanism having a manual control and an automatic control therefor comprising a pressure chamber, a passage leading therefrom to the brake applying means, a valve in said passage normally held against movement, a second passage leading therefrom to an auxiliary chamber and means in the auxiliary chamber to control said valve-holding means, substantially as set forth.

13. A fluid-operated brake-applying mechanism having a pressure chamber, auxiliary chambers connected thereto, a piston in each auxiliary chamber, one piston acting as a valve to close a passage to a brake cylinder, a spring to move said piston toward the pressure chamber, a stronger spring to move the other piston toward the pressure chamber, means co-acting with the first spring to keep said passage closed, and means operated by the second piston to control said last-named means, substantially as set forth.

14. A fluid-operated brake-applying mechanism having a pressure chamber, auxiliary chambers connected thereto, a piston in each auxiliary chamber, one piston acting as a valve to close a passage to a brake cylinder, a spring to move said piston toward the pressure chamber, a stronger spring to move the other piston toward the pressure chamber, means for adjusting the relative tension of the springs, means co-acting with the first spring to keep said passage closed, and means operated by the second piston to control said last-named means, substantially as set forth.

15. A fluid-operated brake-applying mechanism comprising means for automatic application of a brake, said means including a fluid pressure chamber, a piston operable by the pressure in said chamber, means on the stem of the piston for closing a circuit, and a spring for moving the piston against said fluid pressure, substantially as set forth.

16. In a car controlling system, a circuit for motive power, a fluid pressure brake, means in said circuit to prevent operation of said brake and a manually operable circuit breaker to cut off the motive power and cause emergency application of the brakes, substantially as set forth.

17. In a car controlling system, a circuit for motive power, a fluid pressure brake system, a circuit-breaking means held against operation by the normal pressure in the brake system and adapted on undue lowering of pressure to break the circuit, a spring acting to operate said circuit breaker, and means for adjusting the tension of the spring, substantially as set forth.

18. In a car controlling system, a circuit for motive power comprising stationary conductors and conductors moving with the car and contacting with the stationary conductors, in combination with fluid pressure brakes, means in said circuit normally preventing application of said brakes, and means for applying them on interruption of contact between a stationary and a movable conductor, substantially as set forth.

19. In a car controlling system, a trolley wire, a trolley, fluid pressure brakes, manual and automatic controls for said brakes, said automatic control including means in circuit with the trolley to prevent application of said brakes and means to apply the brakes when the trolley leaves the wire, substantially as set forth.

In witness whereof, we have hereunto set our hands at Indianapolis, Indiana, this 8th day of March, A. D., nineteen hundred and twenty-one.

LUI F. HELLMANN.
WILLIAM W. BAXTER.

Witnesses:
E. H. Pflumm,
Carey S. Frye.